United States Patent [19]

Perrey et al.

[11] 4,115,379
[45] Sep. 19, 1978

[54] DYESTUFF SALTS

[75] Inventors: Hermann Perrey, Krefeld; Karlheinz Wolf, Leverkusen; Erich Eimers, Krefeld; Konrad Nonn, Leverkusen; Reinhold Hörnle, Cologne, all of Fed. Rep. of Germany

[73] Assignee: Bayer Aktiengesellschaft, Leverkusen, Fed. Rep. of Germany

[21] Appl. No.: 711,143

[22] Filed: Aug. 3, 1976

[30] Foreign Application Priority Data

Aug. 5, 1975 [DE] Fed. Rep. of Germany ....... 2534830

[51] Int. Cl.$^2$ ............................................. C09B 29/22
[52] U.S. Cl. ........................................ 260/163; 8/86; 8/88; 8/172 R; 260/175; 260/198; 260/380
[58] Field of Search ..................... 8/86, 88, 172 R; 260/163, 175, 198, 380

[56] References Cited

U.S. PATENT DOCUMENTS

| | | | |
|---|---|---|---|
| 2,480,269 | 8/1949 | Seymour | 260/380 |
| 3,926,546 | 12/1975 | Nickel | 8/88 |
| 3,963,418 | 6/1976 | Tullio | 8/172 A |
| 3,995,997 | 12/1976 | Boehmke | 8/172 R |

FOREIGN PATENT DOCUMENTS 1,311,836 3/1973 United Kingdom.

*Primary Examiner*—Paul R. Michl
*Attorney, Agent, or Firm*—Plumley and Tyner

[57] ABSTRACT

Anionic dyestuffs which contain, as the cation an ammonium ion of the formula

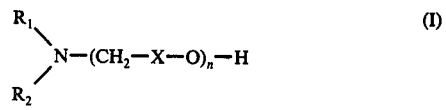

wherein
$R_1$ and $R_2$ independently of one another denote hydrogen, $C_1$-$C_6$-alkyl which is optionally substituted by hydroxyl, cyclopentyl, cyclohexyl or phenyl, naphthyl or benzyl which are optionally substituted by halogen, $C_1$-$C_4$-alkyl or $C_1$-$C_4$-alkoxy, or one of the radicals —$(CH_2$—$X$—$O)_n$—H, [-alkylene-N $(R_3$—$]_p$—$R_3$ or -arylene-N $(R_3)$—$(CH_2$—$X$—$O)_n$—H or denotes, together with the nitrogen atom, a 5-membered to 7-membered heterocyclic radical,
$R_3$ denotes hydrogen, $C_1$-$C_6$-alkyl which is optionally substituted by OH, cyclopentyl, cyclohexyl or phenyl, naphthyl or benzyl which are optionally substituted by halogen, $C_1$-$C_4$-alkyl or $C_1$-$C_4$-alkoxy, or the radical —$(CH_2$—$X$—$O)_n$—H,
X represents

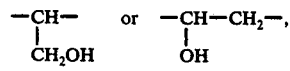

$n$ represents the numbers 1-10, preferably 1-5, and
$p$ represents the numbers 1-4
are readily soluble in water.

3 Claims, No Drawings

DYESTUFF SALTS

The invention relates to salts, which are readily soluble in water, of anionic dyestuffs which contain, as the cation, an ammonium ion of a polyhydroxy-amine of the formula

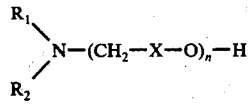  (I)

wherein
- $R_1$ and $R_2$ independently of one another denote hydrogen, $C_1$-$C_6$-alkyl which is optionally substituted by hydroxyl, cyclopentyl, cyclohexyl or phenyl, naphthyl or benzyl which are optionally substituted by halogen, $C_1$-$C_4$-alkyl or $C_1$-$C_4$-alkoxy, or one of the radicals $-(CH_2-X-O)_n-H$, $[-alkylene-N(R_3)-]_p-R_3$ or -arylene-$N(R_3)-(CH_2-X-O)_n-H$ or denotes, together with the nitrogen atom, a 5-membered to 7-membered heterocyclic radical,
- $R_3$ denotes hydrogen, $C_1$-$C_6$-alkyl which is optionally substituted by OH, cyclopentyl, cyclohexyl or phenyl, naphthyl or benzyl which are optionally substituted by halogen, $C_1$-$C_4$-alkyl or $C_1$-$C_4$-alkoxy, or the radical $-(CH_2-X-O)_n-H$,
- X represents $$-\underset{CH_2OH}{\underset{|}{CH}}- \quad \text{or} \quad -\underset{OH}{\underset{|}{CH}}-CH_2-,$$

- n represents the numbers 1–10, preferably 1–5, and
- p represents the numbers 1–4.

Suitable 5-7-membered rings which can be formed by $R_1$ and $R_2$ together with the nitrogen atom are, for example, pyrrolidine, piperidine, morpholine and piperazine, which are optionally substituted by $C_1$-$C_4$-alkyl.

Possible arylene is, for example, o-, m- or p-phenylene and possible alkylene is, for example, $C_2$-$C_6$-alkylene.

Preferred dyestuffs are dyestuffs containing sulpho groups, especially those which contain a sulphonic acid group.

Preferred polyhydroxy-amines are those of the formula

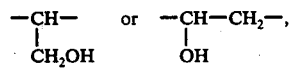

wherein
- Y denotes O, NH, $NCH_3$ or $CH_2$ and
- n denotes a number from 1–5 and
- X has the abovementioned meaning, as well as those of the formula

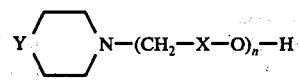

wherein
- $R_4$ denotes $C_1$-$C_4$-alkyl,
- $R_5$ denotes chlorine, bromine or methyl,
- n denotes a number from 1–5 and
- q denotes a number from 0–2 and
- X has the abovementioned meaning, and also those of the formula

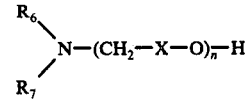

wherein
- $R_6$ denotes hydrogen, $C_1$-$C_4$-alkyl, hydroxy-$C_1$-$C_4$-alkyl or a radical of the formula $-(CH_2-X-O)_n-H$,
- $R_7$ denotes $C_1$-$C_4$-alkyl or hydroxy-$C_1$-$C_4$-alkyl and
- n denotes a number from 1–5 and
- X has the abovementioned meaning, and finally those of the formula

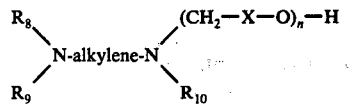

wherein
- $R_8$, $R_9$ and $R_{10}$ independently of one another denote for hydrogen or denote a radical $-(CH_2-X-O)_n-H$, alkylene represents a $C_2$-$C_6$-alkylene radical,
- n denotes an integer from 1–5 and
- X has the abovementioned meaning.

The structure of the anionic dyestuffs is not critical for the invention but those dyestuffs from the series of azo dyestuffs, anthraquinone dyestuffs and phthalocyanine dyestuffs are preferred. The polyhydroxy-amines (I) can be prepared by reacting amines having free N—H groups with glycidol, 1-chloropropane-2,3-diol or epichlorohydrin and water at temperatures of about 50°–200° C. The reaction with glycidol is preferred.

Examples of amines having free N—H groups are ammonia, methylamine, ethylamine, propylamine, butylamine, hexylamine, dimethylamine, diethylamine, dipropylamine, dibutylamine, cyclohexylamine, ethanolamine, isopropanolamine, diethanolamine, di-isopropanolamine, pyrrolidine, piperidine, morpholine, perhydroazepine, piperazine, N-methylpiperazine, 2,5-dimethylpiperazine, aniline, o- m- or p-toluidine, xylidine, benzylamine, o-, m- and p-phenylenediamine, ethylenediamine, propylenediamine, butylenediamine, hexamethylenediamine, diethyenetriamine, triethylenetetramine, tetraethylenepentamine, N-methylaniline, N-ethylaniline and N-2-hydroxyethylaniline.

Examples of the products according to the invention are the reaction products of diethylamine with 3 mols of glycidol, of cyclohexylamine with 2 mols of glycidol, of diethanolamine with 1 mol of glycidol, of ethanolamine with 2 mols of glycidol, of piperidine with 1 mol of glycidol, of p-toluidine with 2 mols of glycidol, of ethylenediamine with 3 mols of glycidol and of N-methylaniline with 1 mol of glycidol.

The invention also relates to highly concentrated aqueous solutions of anionic dyestuffs which contain, as the cation, an ammonium ion of polyhydroxy-amines of the formula (I). In this context concentrated solutions are understood as those which contain about 10–50% by weight of dyestuff. The concentrated solutions can also contain organic solubilising agents, such as urea, formamide, diemthylformamide, water-miscible polyhydric alcohols, such as ethylene glycol, propylene glycol and glycerol, or polyhydroxy-amines of the formula (I). Solubilising agents of this type are described, for example, in German Auslegeschrift (German Published Specification) No. 1,206,296.

In general, the concentrated solutions are prepared by stirring the free dyestuff acids, for example the sulphonic acids, with a mixture of water and polyhydroxy-amine (I) until a homogeneous solution is formed.

The amount of polyhydroxy-amine (I) can vary greatly, so that there can be an excess (based on the amount required for complete salt formation).

The solutions generally contain 10-50% by weight of the anionic dyestuff in the form of the free acid, 40-80% by weight of water and 5-40% by weight of the polyhydroxyamine (I).

The preparation of the dyestuff salts in the form of powders is generally carried out by drying the concentrated aqueous solutions or dispersions of the salts according to the invention, optionally in the presence of customary standardising agents and dust suppressants, and particularly advantageously by spray drying using a one-component nozzle or a two-component nozzle or by means of a whirler disc. However, it is also very readily possible to mix, and grind, the dyestuff acid with the solid amines of the formula (I) and, optionally, customary standardising agents and dust suppressants, or to mix the ground components. In this way pulverulent dyestuff preparations which dissolve readily in water with the formation of the dyestuff salts are obtained. The dyestuff salts, according to the invention, themselves also display very good solubility in water, and in particular even in cold water.

Customary standardising agents which can be used are inorganic salts, such as sodium chloride, sodium sulphate and ammonium phosphate, but preferably non-electrolytes, such as dextrin, sugar, urea, polyvinylpyrrolidone and polyvinyl alcohol, and dust suppressants which can be used are oils, oil/emulsifier mixtures or phthalic acid esters.

Concentrated solutions of anionic dyestuffs have already been described in the literature. Thus, it is known from Belgian Pat. Spec. No 631,379 to prepare concentrated aqueous solutions from water-soluble anionic dyestuffs in the form of the free acid, alkanolamines and, optionally, water-soluble organic solubilising agents.

It is known from German Auslegeschrift (German Published Specification) No. 1,206,296 to prepare concentrated aqueous dyestuff solutions from the alkali metal salts of anionic dyestuffs and in water-soluble organic solvents or solubilising agents, such as urea, formamide, ethylene glycol or polyethylene glycols.

Furthermore, concentrated dyestuff solutions consisting of salts of free dyestuff acids with polyglycol amines, which are prepared from alkylamines and hydroxyalkylamines and ethylene oxide, propylene oxide or butylene oxide, are known from German Auslegeschriften (German Published Specifications) Nos. 2,021,520 and 2,061,760.

Polyhydroxyalkylamine salts of anionic dyestuffs, preferably with 2-amino-2-hydroxymethylpropane-1,3-diol, from which it is also possible to prepare concentrated aqueous solutions, are described in German Offenlegungsschrift (German Published Specification) No. 2,051,303.

Free-flowing dyestuff powders which do not stick together cannot be obtained by means of salt formation with the alkanolamines according to Belgian Pat. Spec. No. 631,379 and with the polyglycol amines according to German Auslegeschriften (German Published Specifications) Nos. 2,021,520 and 2,061,760, whilst, although free-flowing powders can indeed be prepared from alkali metal salts of anionic dyestuffs according to German Auselegeschrift (German Published Specification) No. 1,206,296, these powders are only sparingly soluble in water and do not provide a possibility for preparing concentrated dyestuff solutions.

The new dyestuff salts and the concentrated solutions prepared therefrom are valuable products which are suitable for very diverse application purposes, for example for dyeing and printing materials which contain hydroxyl groups and nitrogen, preferably materials of a textile nature and especially materials of natural or regenerated cellulose, such as cotton, rayon staple or paper, as well as wool, silk, leather and synthetic polyamides and polyurethanes, according to the processes and techniques customary for these materials.

EXAMPLE 1

Preparation of the polyhydroxy-amines (a) 150 g (2 mols) of glycidol are added in the course of 30 minutes to 48.7 g (0.66 mol) of diethylamine, under nitrogen, at 20° C. After stirring for 2 hours at room temperature, the mixture is heated to 150° C. in the course of 1 hour and is left at this temperature for 2 hours. A yellow viscous oil is obtained.

(b) 99.2 g (1 mol) of cyclohexylamine are heated, under nitrogen, to 100°-110° C. and 187.5 g (2.5 mols) of glycidol are added, at this temperature, in the course of 2 hours. The mixture is then stirred for 2 hours at 150° C. A pale yellow, highly viscous oil is isolated.

(c) 150 g (2 mols) of glycidol are added dropwise, in the course of 30 minutes, to 210.1 g (2 mols) of diethanolamine at 100° C. The mixture is then stirred at this temperature for 2 hours. A yellow oil is isolated.

(d) 150 g (2 mols) of glycidol are added dropwise to 61.1 g (1 mol) of ethanolamine at 120° C., under a nitrogen atmosphere. The mixture is then stirred for 1 hour at 150° C. A yellowish, highly viscous oil is isolated.

(e) 450 g (6 mols) of glycidol are added dropwise, in the course of 2 hours, to 510.8 g (6 mols) of piperidine at 100°-110° C., under a nitrogen atmosphere. The mixture is then stirred for 2 hours at 150° C. The reaction product solidifies below 75° C. to give grey crystals and, after recrystallisation from water, toluene or cyclohexane, melts at 78° C. However, purification of the N-2,3-dihydroxypropylpiperidine is not necessary for the subsequent reaction.

(f) 85.2 g (1 mol) of piperidine and 110.5 g (1 mol) of 1-chloropropane-2,3-diol in 300 ml of butanol are heated under reflux for 1 hour. 40 g (1 mol) of sodium hydroxide in the solid form are then added in portions and the mixture is heated under a water separator. 17.5 ml of water separate off. After filtering off the sodium chloride which has precipitated, butanol is distilled off. The reaction product solidifies on cooling and is identical to the polyhydroxy-amine obtained according to (e).

(g) 107 g (1 mol) of toluidine and 221 g (2 mols) of 1-chloropropane-2,3-diol in 500 ml of butanol are heated under reflux for 1 hour. 80 g (1 mol) of sodium hydroxide in the solid form are then added in portions and the mixture is heated under a water separator. 34 ml of water separate off. After filtering off the sodium chloride which has precipitated, the solvent is distilled off. The reaction product solidifies on cooling. When recrystallised from ethyl acetate, the crystals melt at 108° C.

(h) 40.1 g (0.66 mol) of ethylenediamine are heated to 100° C. under a nitrogen atmosphere. 150 g (2 mols) of glycidol are added dropwise, at this temperature, in the course of 1 hour. The mixture is stirred for 1 hour. A dark yellow, high viscous oil is obtained.

(i) 160.8 g (1.5 mols) of N-methylaniline are heated to 100° to 110° C. under nitrogen and 112.5 g (1.5 mols) of glycidol are added, at this temperature, in the course of 2 hours. The mixture is then stirred for 2 hours at 150° C. On cooling, the reaction product, which has a melting point of 76° to 78° C., crystallises out.

EXAMPLE 2

Preparation of the dyestuff salts (a) A mixture consisting of 158 g of a 57% strength aqueous press cake of the blue dyestuff of the formula (I)

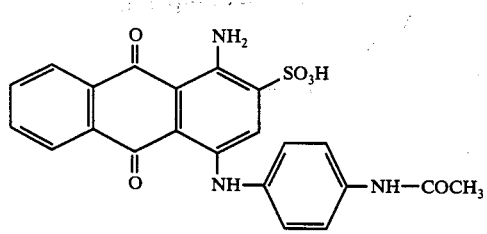

300 ml of water, 60 g of the amine prepared according to Example 1 (g) and 150 g of dextrin is stirred for 1 hour, brought, if necessary, to pH > 4–5 by adding further amine and then dried in a spray dryer using a two-component nozzle, the ingoing air being at a temperature of 180° C. and the outgoing air being at a temperature of 80° C. A blue powder is obtained, 60 g of which dissolve in 1 l of cold water, with stirring.

(b) 30 g of the dyestuff of the formula (I) are mixed, and ground, with 28 g of the amine obtained according to Example 1 (g) and 42 g of dextrin. A blue dyestuff powder having properties the same as those described under Example 2 (a) is obtained.

(c) 30 g of the dyestuff of the formula (I) are mixed, and ground, with 15 g of the amine prepared according to Example 1 (e) or 1 (f) and 55 g of dextrin. A blue dyestuff powder having properties the same as those described under Example 2 (a) is obtained.

(d) 70 g of the yellow dyestuff of the formula (II)

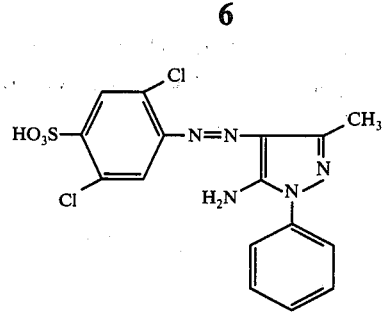

are mixed, and ground, with 25 g of the amine obtained according to Example 1 (e) or 1 (f) and 5 g of dextrin. A yellow powder is obtained, 30 g of which dissolve in 1 l of cold water, with stirring.

(e) 41 g of the red dyestuff of the formula (III)

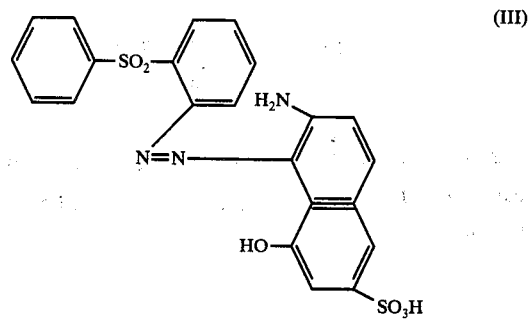

are mixed, and ground, with 12 g of the amine obtained according to Example 1 (e) or 1 (f) and 47 g of dextrin. A red dyestuff powder is obtained, 30 g of which dissolve in 1 l of boiling water. On cooling, the solution remains a low viscosity and displays no tendency to gel.

(f) 20 g of the dyestuff of the formula (IV)

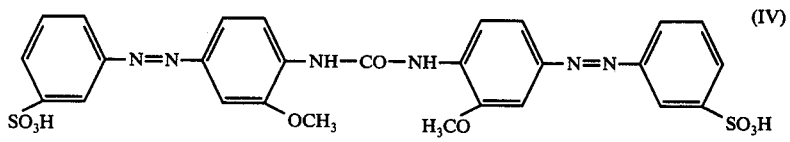

are dissolved in 50 g of water, with the addition of 30 g of the amine obtained according to Example 1 (b). Slight warming to 40°–50° C. increases the rate of dissolution. The concentrated solution of the yellow dyestuff is stable for a long time and, on dilution with water to any desired concentration, also gives stable solutions from which the dyestuff does not crystallise out.

(g) A mixture of 30 g of the dyestuff of the formula (I), 11 g of the amine obtained according to Example 1 (e) or 1 (f), 59 g of dextrin and 700 ml of water is stirred for 1 hour. If necessary, the pH value of the mixture is adjusted to 7 by adding further amine. The mixture is then spray-dried using a two-component nozzle (temperature of the ingoing air 180° C. and of the outgoing air 80° C.). A blue powder which has properties the same as those indicated in Example 2 (a) is obtained.

(h) A mixture of 150 g of a 64% strength press cake of the blue dyestuff of the formula I (see Example 2 (a)), 49 g of the amine obtained according to Example 1 (i), 5 g of dextrin and 500 ml of water is dried as in Example 2 (a). A blue powder which has properties the same as those indicated in Example 2 (a) is obtained.

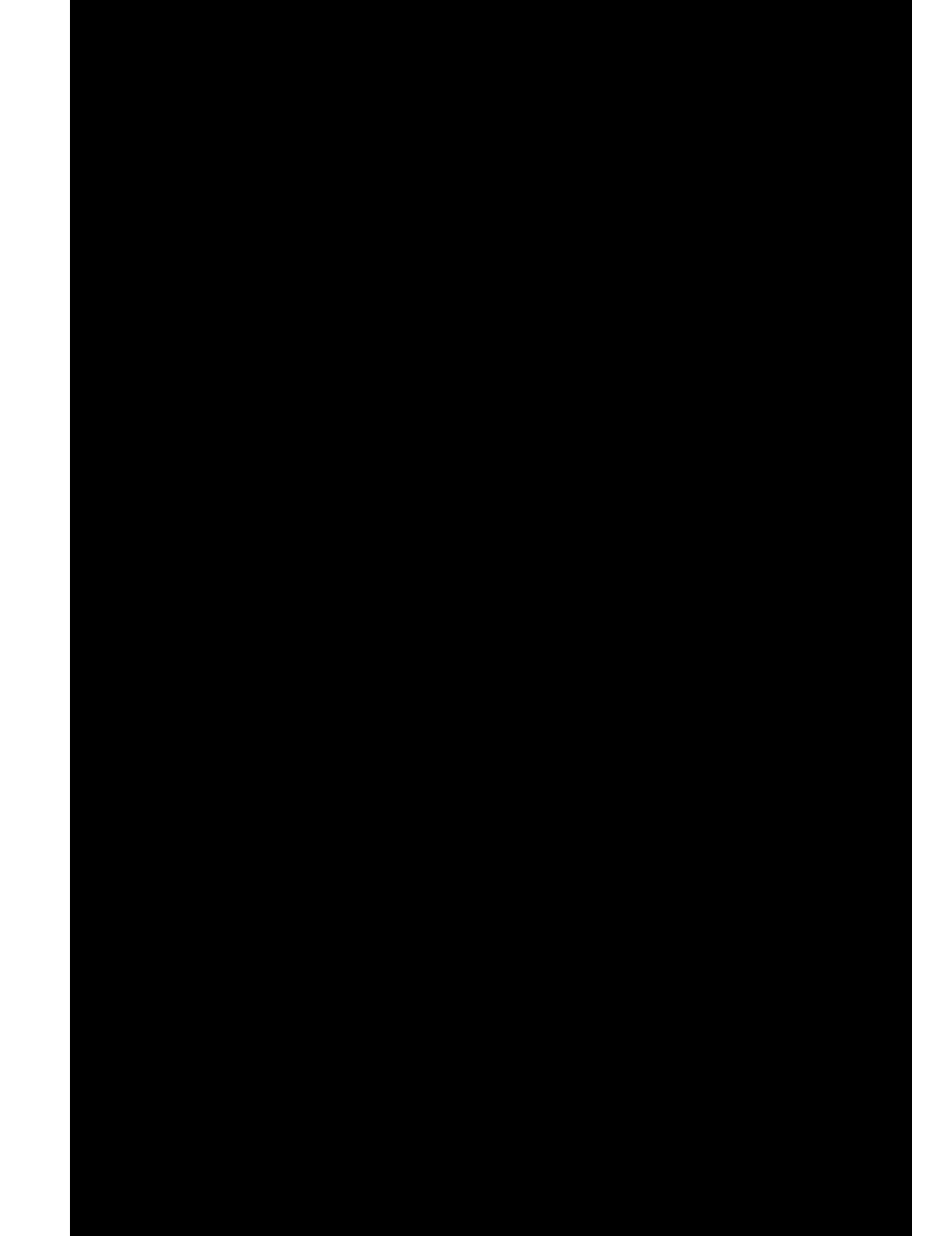

We claim: